M. F. KINDRED.
MANURE LOADER.
APPLICATION FILED OCT. 30, 1913.
1,127,636.
Patented Feb. 9, 1915.
2 SHEETS—SHEET 2.
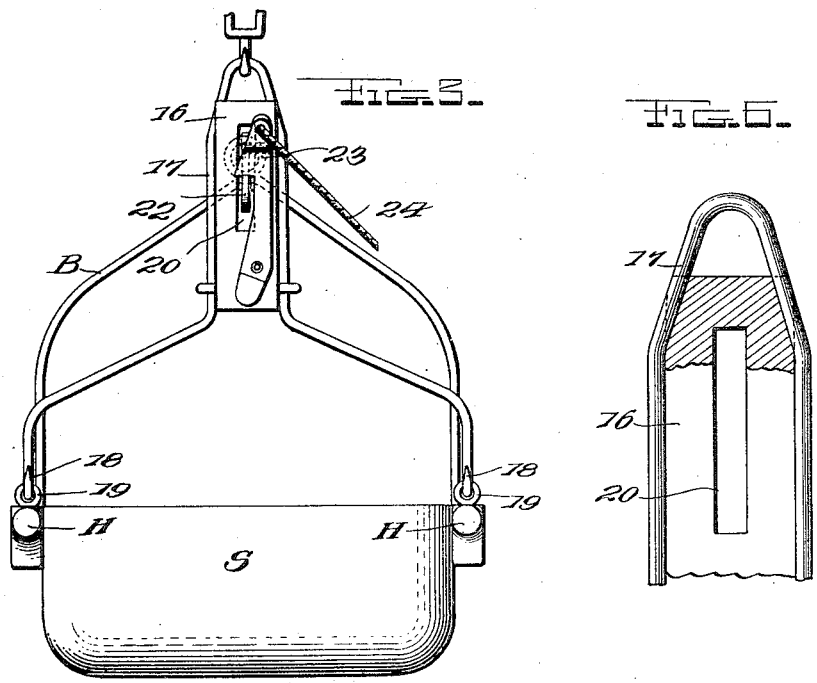
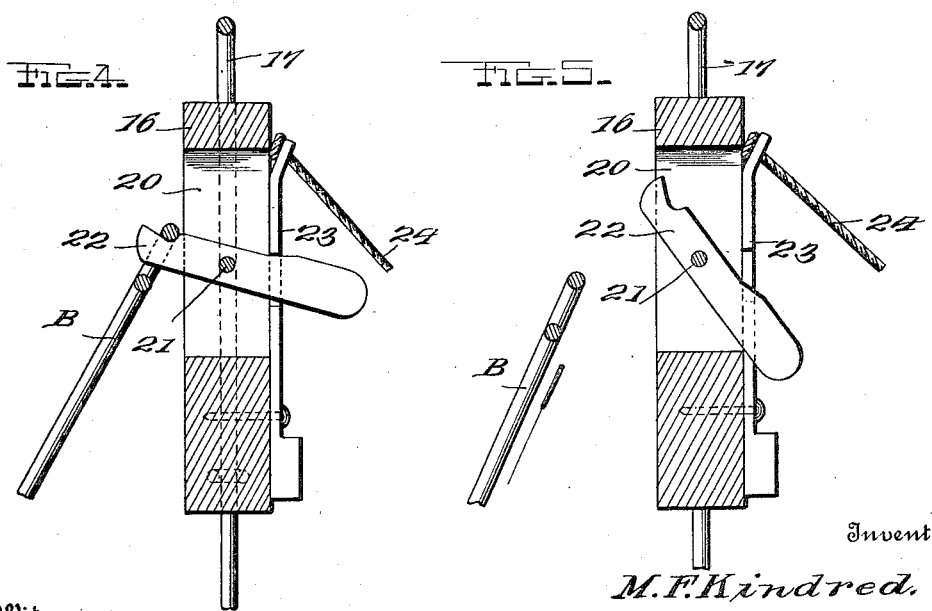
Witnesses
J. P. Pierce
C. Munter
Inventor
M. F. Kindred,
By H. B. Willson & Co.
Attorneys

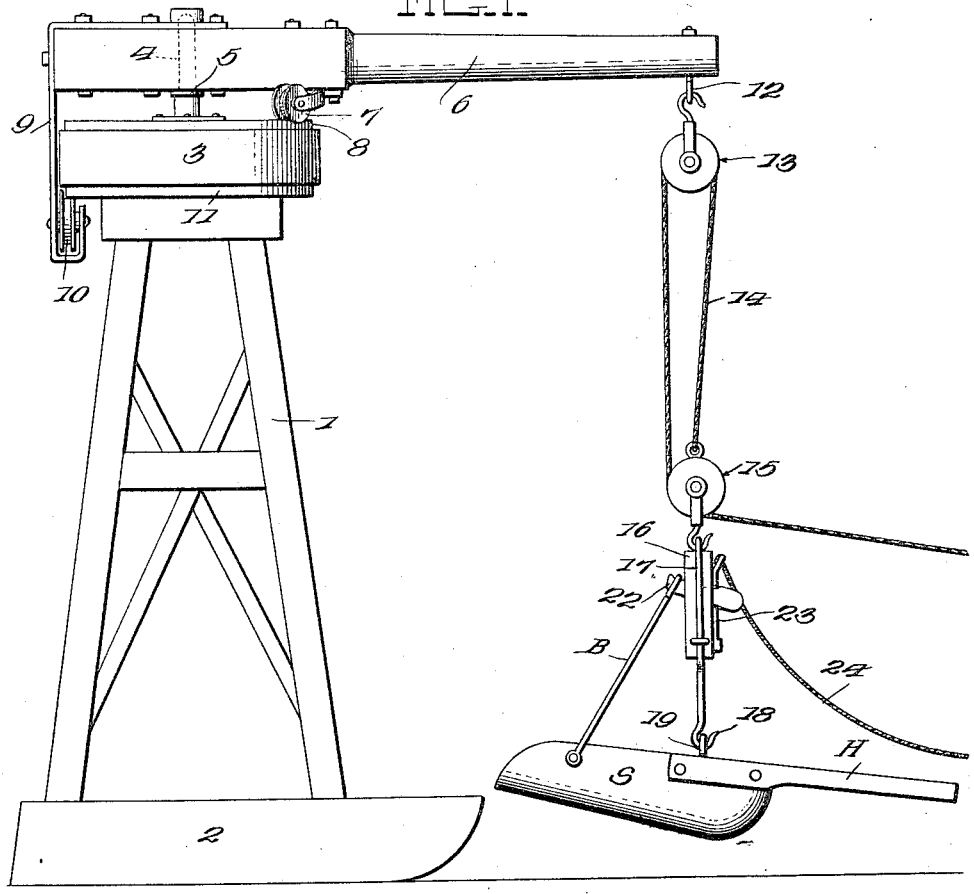

UNITED STATES PATENT OFFICE.

MILLARD F. KINDRED, OF PETERSBURG, ILLINOIS.

MANURE-LOADER.

1,127,636.     Specification of Letters Patent.     Patented Feb. 9, 1915.

Application filed October 30, 1913. Serial No. 798,301.

*To all whom it may concern:*

Be it known that I, MILLARD F. KINDRED, a citizen of the United States, residing at Petersburg, in the State of Illinois, have invented certain new and useful Improvements in Manure-Loaders; and I do declare the following to be a full, clear, and exact description of the invention, such as will enable others skilled in the art to which it appertains to make and use the same.

This invention relates to loading and unloading, and more especially it is a machine including means for hoisting and dumping an ordinary scraper or scoop; and the object of the same is to produce a manure loader wherein a land scraper or scoop of the common variety will serve as the bucket.

Another object is to produce a novel form of portable tower and trip mechanism for the scraper.

To this end the invention consists in the tower and the trip mechanism and connections between it and an ordinary scraper, all as hereinafter more fully described and claimed, and as shown in the drawings wherein—

Figure 1 is a side elevation and Fig. 2 a plan view of this complete manure loader. Fig. 3 is a rear elevation of an ordinary scoop or scraper, showing its connection with the lifting mechanism described. Figs. 4 and 5 are enlarged vertical sections through the block and trip mechanism for the bail of the scraper, and Fig. 6 is a detailed section through the upper end of said block.

One feature of my invention is a tower 1 whose detailed construction is not essential, but it is mounted on wheels or runners 2 as shown so that it can be drawn about with ease. At its upper end it has a flat head 3 from which rises a central pivot bolt 4 passing through a washer 5 and thence through the inner end of a sweep 6 whose length is sufficient to carry its outer end to a considerable distance beyond the base. On the under side of the sweep is a roller 7 traveling on a circular track 8 upon the head, and at the inner end of the sweep is a hanging bracket 9 carrying another roller 10 traveling against the under side of another track 11 secured beneath and around the edge of the head. The weight at the outer end of the sweep thus bears downward on the roller 7 and upward on the roller 10, and as these rollers move on tracks the sweep may be turned around its pivot bolt 4 with ease although it carries a considerable load.

Another feature of my invention is the specific construction of the trip mechanism and connecting devices by means of which an ordinary scoop or scraper may be converted into a bucket for use with this improved manure loader. The scraper S is shown as having the usual handles H and bail B to which the horses are attached to draw it over the ground. To a hook 12 in the outer end of the beam is attached a pulley 13, and a rope 14 leads around this and another pulley 15 and thence to a distant source of power such as a single horse which may be driven forward to raise the scraper as usual. The pulley 15 is attached to an upright block 16 over which passes the bent center of a bail 17 having hooks 18 at its lower ends adapted to engage eyes 19 which are screwed into the handles H of the scraper S. The block is slotted as at 20, and pivoted at 21 within said slot is a latch 22 whose forward end is adapted to engage the bent center of the scraper-bail B as shown, and whose rearward end is held downward at this time by means of a hook-shaped trigger 23 having a trip-rope 24. When the rope is pulled upon the hook of this trigger disengages the rear end of the latch, and this end rises while its front end falls and releases the bail B so that the scraper dumps its contents—being sustained by the hooks of the other bail engaging the eyes 19.

While I have employed this device as a manure loader, it may be used for any equivalent service. The material is gathered in an ordinary scraper in the usual way, and the scraper dragged to a point beneath the block 16. The latter is then lowered by loosening on the rope 14, the hooks engaged with the eyes 19 and the center of the bail B engaged with the front end of the latch, the rear end of the latter being depressed and engaged with the trigger. The rope 14 is now drawn upon to raise the scraper with its load, and then the sweep 6 is swung around to the proper point where it is desired to dump this load. If the device is used as a manure loader, and the manure is to be dropped into a wagon, proper manipulation will raise a scraper full of the manure and swing it around over the wagon, after which the trip-rope is drawn upon and the load is dumped in a manner which will be clear. Meanwhile if the owner possesses a second scraper, that may be loaded by another workman and drawn to the point of use, and after the first scraper has been dumped it can be quickly detached from the hooks 18 and the second one engaged with the device in a manner already described—thus affording no interruption to business. After use, the base 2 can be drawn to any desired point for storage. In fact, this base with its tower and sweep may be employed for other purposes than as herein illustrated, without departing from the spirit of my invention. The proportions and materials of parts are not important.

What is claimed as new is:

1. A device of the character set forth comprising a scraper, a suspending bail carried thereby, a block supported by said bail, said block having therein a longitudinally extending slot, a dragging bail having its extremities connected to the forward portion of said scraper, a trip pivotally mounted intermediate its ends within said slot, one end of said trip being adapted to engage said bail to support the forward portion of said scraper in a raised position and a dog coöperating with the free end of said trip substantially as and for the purpose set forth.

2. A device of the character set forth comprising a scraper, a suspending bail carried thereby, a block supported by said bail, said block having therein a longitudinally extending slot, a dragging bail having its extremities connected to the forward portion of said scraper, a trip pivotally mounted intermediate its ends within said slot, one end of said trip being adapted to engage said bail to support the forward portion of said scraper in a raised position, a dog coöperating with the free end of said trip to retain the same in set position and means to release said dog substantially as and for the purpose set forth.

3. A device of the character described comprising a scraper, a suspending bail connected therewith, said bail including two side pieces, the upper portions of the latter being disposed in parallel relation, a block intermediate the parallel portions of said bail, said block having therein a longitudinally extending slot, a trip pivotally and transversely mounted in the latter, said trip having its extremities connected to the forward portion of said scraper, the upper end of said bail being adapted to project within the indenture formed in said trip to maintain the forward portion of the scraper in raised position, a dog pivotally mounted on said block, contiguous to the inner end of said trip to retain the latter in set position and means to release said dog substantially as and for the purpose set forth.

4. In a machine of the class described, the combination with overhead lifting mechanism, a block carried thereby and having a slot through its body, a latch extending through said slot and pivoted between its ends therein, a trigger pivoted to the rear face of the block and having a hook adapted to engage the rear end of said latch when the latter is depressed, and a trip-rope connected with said trigger; of a bail whose center is secured over said block and whose lower ends have hooks, and a scraper having eyes in its handles adapted to be removably engaged with said hooks, the bail of said scraper adapted to be engaged with the front end of said latch, for the purpose set forth.

In testimony whereof I have hereunto set my hand in presence of two subscribing witnesses.

MILLARD F. KINDRED.

Witnesses:
J. G. WATKINS,
LUTTER CAMPBELL.

Copies of this patent may be obtained for five cents each, by addressing the "Commissioner of Patents, Washington, D. C."